(12) United States Patent
Fakeri-Tabrizi et al.

(10) Patent No.: US 10,587,646 B2
(45) Date of Patent: *Mar. 10, 2020

(54) ANALYZING DNS REQUESTS FOR ANOMALY DETECTION

(71) Applicant: Nominum, Inc., Cambridge, MA (US)

(72) Inventors: Ali Fakeri-Tabrizi, San Mateo, CA (US); Thanh Nguyen, Newark, CA (US); Hongliang Liu, Campbell, CA (US); Paul O'Leary, San Francisco, CA (US); Mikael Kullberg, Stockholm (SE); Iurii Iuzifovich, Los Gatos, CA (US); James Paugh, San Carlos, CA (US); Robert S. Wilbourn, Palo Alto, CA (US)

(73) Assignee: Nominum, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 16/107,627

(22) Filed: Aug. 21, 2018

(65) Prior Publication Data

US 2019/0068634 A1 Feb. 28, 2019

Related U.S. Application Data

(63) Continuation of application No. 15/799,547, filed on Oct. 31, 2017, now Pat. No. 10,084,814, which is a (Continued)

(51) Int. Cl.
*H04L 29/06* (2006.01)

(52) U.S. Cl.
CPC ...... *H04L 63/1441* (2013.01); *H04L 63/1425* (2013.01); *H04L 2463/144* (2013.01)

(58) Field of Classification Search
None
See application file for complete search history.

(56) References Cited

U.S. PATENT DOCUMENTS

| 8,090,679 B2 | 1/2012 | Zhuge et al. |
| 8,682,812 B1 | 3/2014 | Ranjan |

(Continued)

OTHER PUBLICATIONS

U.S. Appl. No. 15/799,547.
(Continued)

*Primary Examiner* — Christopher A Revak

(57) ABSTRACT

A computer-implemented method for detecting anomalies in DNS requests comprises receiving a plurality of DNS requests generated within a predetermined period. The predetermined period includes a plurality of DNS data fragments. The method further includes receiving a first DNS request and selecting a plurality of second DNS requests from the plurality of DNS requests such that each of the second DNS requests is a subset of the first DNS request. The method also includes calculating a count value for each of the DNS data fragments, where each of the count values represents a number of instances the second DNS requests appear within one of the DNS data fragments. In some embodiments, the count values for each of the DNS data fragments can be normalized. The method further includes determining an anomaly trend, for example, based on determining that at least one of the count values exceeds a predetermined threshold value.

16 Claims, 3 Drawing Sheets

Related U.S. Application Data continuation of application No. 14/937,678, filed on Nov. 10, 2015, now Pat. No. 9,843,601, which is a continuation of application No. 13/177,504, filed on Jul. 6, 2011, now Pat. No. 9,185,127.

(56) References Cited

U.S. PATENT DOCUMENTS

| | | |
|---|---|---|
| 8,874,550 B1 | 10/2014 | Soubramanien et al. |
| 9,185,107 B2 | 11/2015 | Neou et al. |
| 9,191,393 B2 | 11/2015 | Tovar |
| 9,215,123 B1 | 12/2015 | Fears et al. |
| 9,843,601 B2 | 12/2017 | Fakeri-Tabrizi et al. |
| 10,084,814 B2 | 9/2018 | Fakeri-tabrizi et al. |
| 10,164,989 B2 | 12/2018 | Paugh et al. |
| 2008/0133540 A1 | 6/2008 | Hubbard et al. |
| 2010/0037314 A1 | 2/2010 | Perdisci et al. |
| 2010/0125911 A1 | 5/2010 | Bhaskaran |
| 2010/0281536 A1 | 11/2010 | Richards et al. |
| 2012/0042381 A1 | 2/2012 | Antonakakis et al. |
| 2012/0158626 A1 | 6/2012 | Zhu et al. |
| 2012/0304244 A1 | 11/2012 | Xie et al. |
| 2018/0176241 A1* | 6/2018 | Manadhata ......... H04L 63/1425 |
| 2018/0183830 A1* | 6/2018 | Wessels ............. H04L 63/1458 |

OTHER PUBLICATIONS

U.S. Appl. No. 14/937,678, filed Nov. 10, 2015.
U.S. Appl. No. 13/177,504, filed Jul. 6, 2011.
Transmittal letter MPEP 609, submitted with this SB08 form, Aug. 21 2018, 1 page.
U.S. Appl. No. 14/937,656, filed Nov. 10, 2015.
U.S. Appl. No. 14/943,908.
U.S. Appl. No. 16/197,606.
U.S. Appl. No. 16/274,351.
Notice of Allowance, for U.S. Appl. No. 14/937,656, dated Jan. 17, 2019, 56 pages.
Office Action, for U.S. Appl. No. 14/937,656, dated Dec. 19, 2018, 49 pages.
U.S. Appl. No. 14/937,656 (PA7152US) Non-Final Rejection dated Mar. 9, 2018, 50 pages.
U.S. Appl. No. 14/937,616 (PA7241), filed Nov. 10, 2015 available in IFW.
Office Action, U.S. Appl. No. 14/937,616, (PA7241US) dated Apr. 6, 2018, 19 pages.
U.S. Appl. No. 14/937,656 (PA7152) Final Rejection dated Aug. 8, 2019, 38 pages.
U.S. Appl. No., 14/937,699 (PA7255US) Notice of Allowance dated Jun. 19, 2019, 19 pages.
Notice of Allowance for U.S. Appl. No. 14/937,699, with attachments, dated Dec. 4, 2019, 20 pages.

* cited by examiner

ANALYZING DNS REQUESTS FOR ANOMALY DETECTION

CROSS-REFERENCE TO RELATED APPLICATIONS

The present application is a continuation of U.S. patent Ser. No. 15/799,547, filed Oct. 31, 2017, which is a continuation of U.S. patent application Ser. No. 14/937,678 filed on Nov. 10, 2015, entitled "Analyzing DNS Requests for Anomaly Detection" (now U.S. Pat. No. 9,843,601 issued Dec. 12, 2017) which is a continuation-in-part of U.S. patent application Ser. No. 13/177,504 filed on Jul. 6, 2011, entitled "Network Protection Service," now U.S. Pat. No. 9,185,127 issued on Nov. 10, 2015, all which are incorporated herein by reference in their entirety for all purposes.

TECHNICAL FIELD

This disclosure relates to processing Domain Name System (DNS) data. More specifically, this disclosure relates to systems and methods for detecting anomaly trends in DNS request streams.

BACKGROUND

In computer networking, domain names can help identifying locations where certain information or service are located on a public or private network. Domain names are typically formed according to rules and procedures of the DNS. Domain names can be used for various naming and addressing purposes. In general, a domain name can be resolved to an Internet Protocol (IP) resource, such as a personal computer, a server hosting website pages, or a website page or service communicated via the Internet. Thus, the DNS can allow translating domain names (such as "www.example.com") into the corresponding IP address (such as "123.4.56.78") needed to establish Transmission Control Protocol/Internet Protocol (TCP/IP) communication over the Internet.

Traditionally, DNS servers resolve (i.e., translate to IP addresses) domain names upon receiving DNS queries associated with domain names. When a DNS server receives a query from a client, the DNS server checks if it can answer the DNS query authoritatively based on local information available to the DNS server. If the queried domain name matches a corresponding resource record in a local cache, the DNS server answers authoritatively. If no local record exists for the queried domain name, the DNS server checks if it can resolve the domain name using locally cached information from historical data. If a match is found, the DNS server answers based on the historical data. If the queried domain name does not find a match at the DNS server level, the query process can continue with assistance from other DNS servers.

One of the important tasks for Internet Service Providers (ISPs), malware protection providers, marketing providers, and many other systems is identifying malicious activities, such as web-based security threats or botnets, at early stages. Malicious code authors use a variety of methods to prevent authorities and users from identifying security threat sources. These methods range from adaptive computer coding techniques to functions changing command and control (C&C) server locations using different infected computers. It may be difficult to detect certain malware operations, while the costs of continuous maintaining security measures, such as honeypots, and related infrastructure are high. Thus, fleeting and evolving nature of various web-based security threats requires new methods of identification of malicious domain names.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to computer-implemented methods and systems for detecting anomalies in DNS requests. In some example embodiments, a method includes receiving DNS data, which includes a plurality of DNS requests generated within a predetermined period. The predetermined period can include a plurality of DNS data fragments. A DNS data fragment can be defined as one of a plurality of DNS data queries/responses received over a predetermined period of time (e.g., an hour, day, week, month, and year). During this predetermined period of time, a plurality of DNS data fragments can be received. The DNS data fragments can be sufficiently small to accommodate at least one DNS request, although the DNS data fragments can be of any arbitrary size and received over any arbitrary period of time (e.g., in the range of seconds, minutes, or hours). The method can further include receiving or selecting a first DNS request ($Q_i$), which is associated with a domain name. The method also include selecting a plurality of second DNS requests ($Q_j$) from the plurality of DNS requests such that each of the second DNS requests is a subset of the first DNS request. The method can also include calculating a count value for each of the DNS data fragments, where each of the count values represents a number of instances or a frequency the second DNS requests appear in one of the DNS data fragments.

In some embodiments, the count values for each of the DNS data fragments can be normalized. The normalization of the count values can include calculating a total count value for the predetermined period such that the total count value represents a number of instances the second DNS requests appear in all of the DNS data fragments and dividing each of the count values by the total count value. Moreover, each of the DNS data fragments can range from about 1 second to about one week, while the predetermined period can range from about 1 minute to about one year.

The method further includes determining an anomaly trend based on the count values of the plurality of second DNS requests associated with the plurality of the DNS data fragments. The determination of the anomaly trend can be determined when at least one of the count values exceeds a predetermined threshold value, where the predetermined threshold value can be associated with an average or a median of the count values for the predetermined period. In some embodiments, the anomaly trend can be indicative of a malicious activity associated with the first DNS request.

In certain embodiments, the first DNS request is associated with a domain name, while the second DNS request is associated with the same domain name. In other embodiments, the first DNS request is associated with a core domain name, while each of the second DNS requests is associated with the same core domain name. In yet other embodiments, the first DNS request is associated with a domain name and one or more sub-domain names, while each of the second DNS requests is associated with at least one of the same sub-domain names.

In certain embodiments, the first DNS request and each of the second DNS requests are associated with a single DNS network. In other embodiments, the first DNS request and each of the second DNS requests are associated with a single Content Delivery Network (CDN). In yet other embodiments, the first DNS request and each of the second DNS requests are originated from the same locality (e.g., same country, state, county, city, district, or building).

In certain embodiments, the method may further include detecting one or more families of the domain name, wherein the second DNS requests are associated with the one or more families of domain names. In yet other embodiments, the method may further include clustering the first DNS query and the plurality of second DNS requests in a database. Furthermore, in some embodiments, the method may include marking the first DNS query and the plurality of second DNS requests based on the determination of the anomaly trend.

According to another aspect of this disclosure, there is provided a system comprising at least one processor and at least one memory storing processor-executable codes. The at least one processor is configured to implement the aforementioned method for detecting anomalies of DNS requests.

According to yet another aspect of this disclosure, there is provided a non-transitory processor-readable medium having instructions stored thereon. When these instructions are executed by one or more processors, they cause the one or more processors to implement the above-described method for detecting anomalies of DNS requests.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF DRAWINGS

Exemplary embodiments are illustrated by way of example and not limitation in the figures of the accompanying drawings, in which like references indicate similar elements.

DETAILED DESCRIPTION OF EXAMPLE EMBODIMENTS

Figure 1:
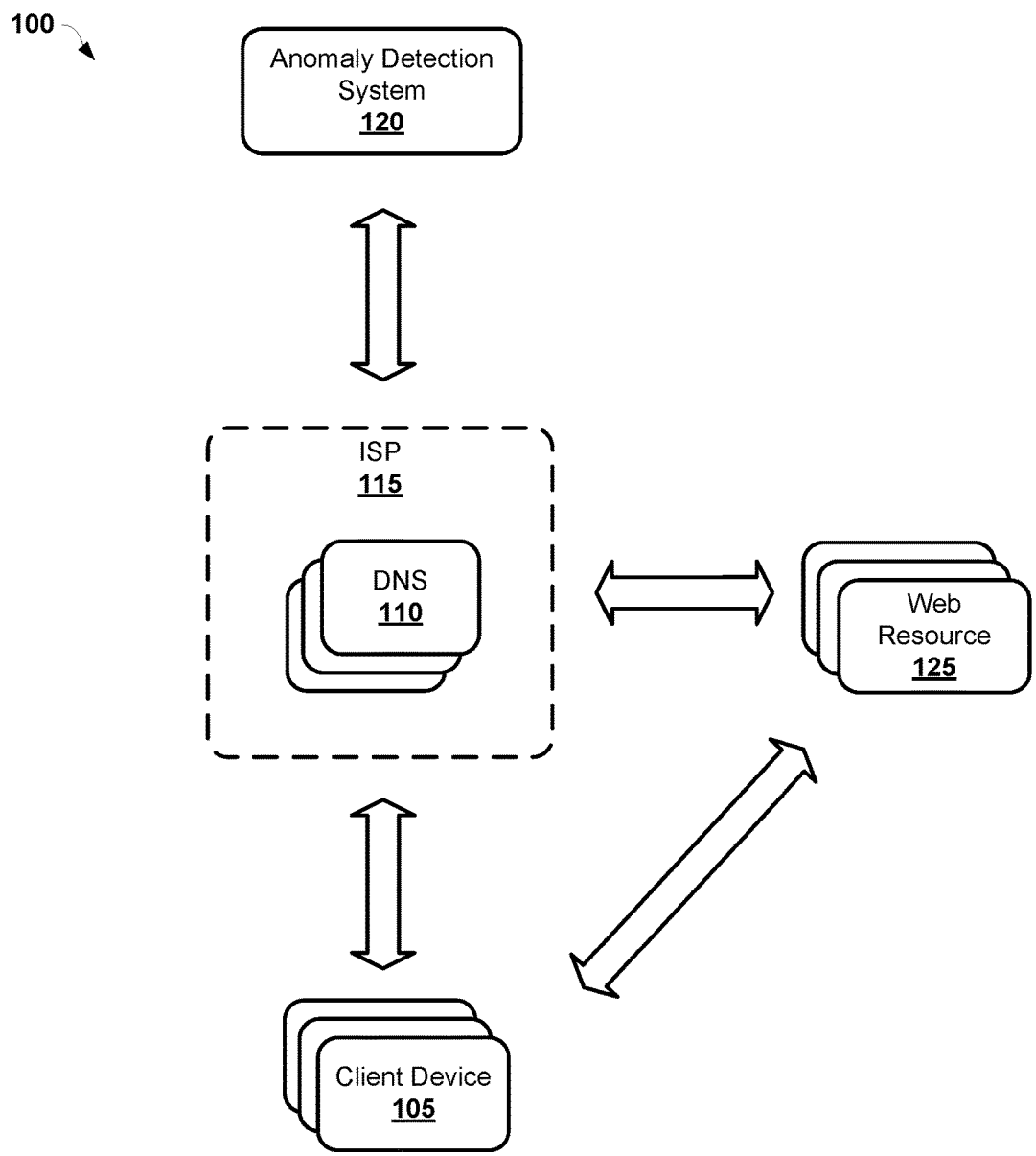
FIG. 1 is a block diagram of an example computer network environment suitable for practicing methods for detecting anomalies in DNS requests.

The technology disclosed herein is related to methods and system for detecting anomalies in streams of DNS requests. The anomalies can represent various malicious activities or can be associated with certain Internet search or marketing trends. The technology can be applied to detecting anomaly trends but the anomaly trends do not have to be necessarily associated with malicious activities. When applied to malicious activities, this technology can determine a certain probability that there is a malicious activity associated with certain domain names, servers or clients, and this malicious activity may require further analysis or research. The present technology can also allow detecting unusual patterns in DNS traffic to identify new types of malicious activities, where neither the behavior nor specific malware signatures are available.

Thus, the present technology can be referred to as an "Early Warning System" that marks or reports anomaly trends in DNS traffic within a short time of occurrence of such anomaly trends, which may be indicative of infected clients, domains, servers, or other network elements. Actions that an Internet Service Provider (ISP) can take in response to the reported anomaly can range from observing to rate-limiting or blocking traffic from certain Internet Protocol (IP) addresses or to certain domain names.

The present technology is based on the premise that any anomalous activity can be reflected as an unusual trend or behavioral pattern in the DNS logs. Combined with technologies for domain name reputation scoring and for calculating a rank of domain names, the detected anomalies can result in lists of suspicious domain names, IP addresses, and corresponding networks. Thus, the present technology can provide assistance with malware detection in real-time and with a low rate of false positives.

According to various embodiments of this disclosure, the overall approach for detection of DNS request anomalies is based on receiving and processing a plurality of DNS requests generated within a predetermined period (e.g., an hour, day, week, month, and year). The predetermined period includes a plurality of DNS data fragments, which can be sufficiently small to accommodate at least one DNS request, although DNS data fragments can be of any arbitrary or reasonable duration (e.g., in the range of seconds, minutes, or hours). Furthermore, a first DNS request of interest can be selected by a user or an automated process. Based on this selection, a plurality of second DNS requests from the plurality of DNS requests can be selected such that each of these second DNS requests is a subset of the first DNS request. For example, the second DNS requests can be associated with the same domain name or same subdomain names as in the first DNS request. Furthermore, a count value can be calculated for each of the DNS data fragments such that each of the count values represents a number of instances or a frequency the second DNS requests appear within one of the DNS data fragments. The count values can be normalized by time (e.g., by DNS data fragments and by hour).

Furthermore, an anomaly trend can be determined by analyzing the count values. For example, an anomaly trend or a spike can be determined when at least one of the count values exceeds a predetermined threshold value. However, any other analysis of time-based patterns can be applied to identify anomalies. Accordingly, if the anomaly is determined, certain domain names, servers or clients can be marked, clustered or reported to an external or internal service, stored in a memory, displayed to a user, and so forth. In some embodiments, the technology provides for determining a probability score based on the count values to indicate that a certain domain name, server or client associated with the first and second DNS requests is malicious.

For purposes of this patent document, it is important to provide definitions of certain terminology as used herein. The terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to." Additionally, all ranges provided herein include the upper and lower values of the range unless explicitly noted. For example, the term "about" shall mean a reasonable deviation of a value accompanying this term. If it is not specified otherwise, the term "about" refers to the variation of 20% from an indicated value. In the case of a range of values, the term "about" may refer to a 20% variation from both the lower and upper limits of the range.

Furthermore, the term "DNS" shall have its ordinary meaning of Domain Name System, which represents a hierarchical distributed naming system for computers, servers, content, services, or any resource available via the Internet or a private network. The terms "domain" and "domain name" shall be given its ordinary meaning such as a network address to identify the location of a particular website page, web resource, file, content, service, computer, server, and so forth. In certain embodiments, domain names can be identified by one or more IP addresses. Each domain name can be made up of a series of character strings separated by dots. The right-most label in a domain name is known as the "top-level domain" (TLD) such as ".com," ".org" and the like. Each top-level domain supports second-level domains, such as the "nominum" level in "www.nominum.com." Each second-level domain (2LD) can include a number of third-level domains located immediately to the left of the second-level domain, e.g. the "www" level in "www.nominum.com." There can be additional level domains as well, with virtually no limitation. For example, a domain with additional domain levels could be "www-.photos.nominum.com."

In this disclosure, the term "core domain name" shall mean a parent domain, which is the combination of a second-level domain and a top-level domain, e.g. "nominum.com." The term "subdomain name" shall mean one or more additional domain levels, hostnames, and the like. The term "subdomain name" can also be referred to as a child domain, meaning that it is subordinated (nested) to its corresponding parent domain or another child domain. Further, the term "Fully Qualified Domain Name" or FQDN shall mean the complete domain name for a specific computer, server, or host. The FQDN may consist of two parts: a subdomain name and a core domain name.

The term "DNS request" shall mean a message requesting the resolution of a domain name or IP address. The DNS request can be forwarded from a client device to a DNS server. For purposes of this patent document, the terms "DNS query," "DNS inquiry," and "DNS request" shall mean the same and therefore can be used interchangeably. The response to a DNS request is referred to a "DNS response." In particular, a DNS response may comprise a domain name, an IP address, an error message, or an error code. It should be noted that the resolution of a DNS request may concern any application, which uses the DNS protocol through a computer network such as, for example, web browsing or sending e-mails, among other applications.

The term "count value" shall mean a number of instances or a frequency of individual DNS requests that present within a certain period (e.g., within one DNS data fragment). The count value can be an integer number.

The term "PRSD" shall mean Pseudo Random Subdomain, which is a certain type of Distributed Denial-of-Service (DDoS) attack that uses DNS queries where the leftmost label is randomized to create additional work for the DNS.

Referring now to the drawings, various embodiments will be described, wherein like reference numerals represent like parts and assemblies throughout the several views. It should be noted that the reference to various embodiments does not limit the scope of the claims attached hereto. Additionally, any examples set forth in this specification are not intended to be limiting and merely set forth some of the many possible embodiments for the appended claims.

FIG. 1 shows a block diagram of an example computer network environment 100 suitable for practicing the methods for detecting anomalies of DNS requests as described herein. It should be noted, however, that the environment 100 is just one example, and simplified embodiment provided for illustrative purposes and reasonable deviations of this embodiment are possible as will be evident for those skilled in the art.

The computer network environment 100 includes at least one client device 105 (also referred herein to as "client" for simplicity). The client device 105 is generally any appropriate computing device having network functionalities allowing communicating under any existing IP protocols (e.g., IPv4, IPv6). For these ends, each client device 105 can be associated with an IP address. Some examples of the client devices 105 include, but are not limited to, a computer (e.g., laptop computer, tablet computer, desktop computer), server, cellular phone, smartphone, gaming console, multimedia system, intelligent television device, set-top box, infotainment system, in-vehicle computing device, informational kiosk, robot, smart home computer, home appliance device, Internet-of-Things (IoT) device, Internet-of-Everything (IoE) device, sensor, thermostat, software application, computer operating system, modem, router, and so forth. The environment 100 may include multiple client devices 105, but not necessarily.

The client devices 105 can be operated by users or they can be operated autonomously (e.g., automatically checking for updates on a network resource). Thus, the client device 105 can make certain client inquiries to the computer network environment 100, such as a request to open a website page hosted by a web resource 125, download a file from the web resource 125, and so forth. A client inquiry may include a DNS request associated with a domain name (e.g., in the form of "www.nominum.com"), which requires the resolution by a DNS server into one or more corresponding IP addresses associated with the web resource 125. The DNS request initiated by the client device 105 can be transmitted to a recursive DNS server, or simply, DNS 110, which can be associated with a particular ISP 115. The ISP 115 can include a plurality of DNSs 110.

The DNS 110 resolves the DNS request and returns a DNS response with an IP address associated with the domain name of the DNS request. The IP address can be delivered to the client device 105. In certain embodiments, the DNS request includes the following data: an IP address of the client 105, a time stamp of the DNS request, DNS query name (e.g., a domain name), and/or a DNS query type. The DNS request can also include many other DNS resource records (e.g., address records, address prefix lists, certificate records, identifiers, key records, naming authority pointer, name server record, location record, signature, pointer record, service locator, etc.). The DNS data can be aggregated or stored in a cache of DNS 110.

Still referring to FIG. 1, there is shown an anomaly detection system 120 which implements the methods for detecting anomalies of DNS requests as described herein. The anomaly detection system 120 may be implemented on a server, a plurality of servers or provide a cloud-based DNS anomaly detection service. The anomaly detection system 120 can include hardware modules (e.g., decision-making logic, dedicated logic, programmable logic, application-specific integrated circuit (ASIC)), software modules (e.g., software run on a general-purpose computer system or a dedicated machine, microcode, computer instructions), or a combination of both. The anomaly detection system 120 is in operative communication with the ISP 115, including any devices of the ISP 115 such as one or more DNSs 110. In some embodiments, the anomaly detection system 120 can be integrated, combined or embedded into one or more ISPs 115 or into one or more DNSs 110.

The anomaly detection system 120 is configured to receive and process DNS data to detect anomalies such as spikes in a count of certain DNS records within certain periods or detect any other time-based patterns that can suggest of an anomaly. Thus, the anomaly detection system 120 can receive from one or more ISPs 115 or DNSs 110 certain "raw data." This raw data can include a plurality of DNS requests. In some embodiments, DNS requests can be provided of certain types. In other embodiments, the anomaly detection system 120 can filter the received DNS requests based on one or more predetermined criteria. Furthermore, the plurality of DNS requests can be received by the anomaly detection system 120 as a live stream or it can be presented as chunks of data. These chunks of data can be of certain predetermined periods (e.g., 10 minutes data chunks, one-hour data chunks, one-day data chunks, and the like). In yet other embodiments, the plurality of DNS requests can be a Kafka-based data stream. The Kafka-based data stream is based on "Apache Kafka" open-source message broker, which aims to provide a unified, high-throughput, low-latency platform for handling real-time data feeds.

When the plurality of DNS requests is received by the anomaly detection system 120, only certain fields of DNS requests can be used. For example, the anomaly detection system 120 can retrieve for further use one or more of the following: a FQDN (including a core domain name and all subdomain names, if any), timestamp, response code, customer name, client IP address, query type, answer fields, and query flags (if any).

Further, the anomaly detection system 120 can select a particular DNS request (also referred hereinto as "first DNS request" or "Qi") from the plurality of received DNS requests. In other embodiments, the anomaly detection system 120 can receive an instruction from a user or a machine. The instruction can include a certain DNS request of interest (i.e., Qi). Alternatively, the instruction can command the anomaly detection system 120 to select one of the received DNS requests for further analysis. In some embodiments, the anomaly detection system 120 can be configured to automatically and consecutively select some or all of the received DNS requests as Qi.

Further, the anomaly detection system 120 can select certain DNS requests form the plurality of received DNS requests, which are referred herein to as "second DNS requests" or Qj. The selection is performed such that each of the second DNS requests is a subset of the first DNS request. The second DNS request is a subset of the first DNS request when both of them refer to the same FQDN, the same domain name, the same core domain name, or when they share at least some of common subdomains.

The anomaly detection system 120 can then calculate a count value for each of the DNS data fragments such that each of the count values represents a number of instances or a frequency the second DNS requests appear or present within one of the DNS data fragments. Simply put, the anomaly detection system 120 counts a number of second DNS requests in each of the DNS data fragments.

Further, the anomaly detection system 120 can optionally normalize the count values by calculating a total count value for the predetermined period such that the total count value represents a number of instances the second DNS requests appear in all of the DNS data fragments, and normalizing the count values by their corresponding norm values.

In some embodiments, the anomaly detection system 120 can generate a "Norms" list. The norms list may include 24 lists (each for each hour of the day) of domain names that have been seen since N days ago, including their corresponding subdomain count (a number of instances a subdomain appears in DNS traffic) and DNS request count, both normalized (i.e., divided by N). Each of these 24 lists represents the norm for one hour in the day. For example, list No. 4 represents the norm for the period of 3:00 a.m. to 4:00 a.m. One of the reasons of dividing the norm to 24 separated hours is to compare each ten minutes of DNS request traffic with its corresponding hour norm to account for daily patterns in the traffic. It should be noted, however, that the number of norms can be different, arbitrary selected, or selected based on predetermined criteria. Moreover, the aforementioned periods and DNS data fragments can be of any reasonable range.

According to some embodiments, a list of 30 (60, 90, etc.) days of history, including the frequency of appearance of each domain name in DNS requests can help in detecting new domain names. For example, a domain name can appear and be considered new when this domain name haven't detected in DNS request traffic for at least 30 days, 60 days, 90 days, or any other reasonable period (e.g., in the range from minutes to years). Additionally, a domain reappearance in the DNS request traffic after not being seen for 60 days can be considered an anomaly.

In some embodiments, the Public Suffix List can be used to detect the core domains from DNS requests. For example, the Public Suffix List can be used to find the TLDs, which then leads the anomaly detection system 120 to find the core domain as the second-from-the-right element to the suffix.

As already outlined above, the DNS data fragments and the predetermined period, during which DNS data is received, may be of any reasonable range (e.g., from seconds to years). However, in some embodiments, a proper selection of the predetermined period can be critical, because some malicious activities might not be seen in short time periods. For example, a well-distributed botnet attempts to distribute its traffic across time, which makes it less visible in any individual 10-minute intervals. However, by selecting at the longer time periods (for example, 20 minutes or an hour), the anomaly detection system 120 can more effectively detect malicious anomalies. In some embodiments, a combination of 10 minutes, hourly, daily anomaly detection can be employed by the anomaly detection system 120 in order to cover a variety of anomalies visible in different time frames.

The following provides some use case examples, where the anomaly detection system 120 effectively identified certain anomalies in DNS requests. In a first example use case, the anomaly detection system 120 obtained DNS requests in 10-minute windows. The anomaly detection system 120 then selected the query Qi with the timestamp ti. Further, in the time window, containing ti, the anomaly detection system 120 looks up for other DNS requests Qj in the way that Qj be a subset of Qi, and Qi begins with Qj meaning that Qi and Qj share one or more common subdomains. For example, Qi="ali.com.nominum.com" and Qj="ali.com." At the following steps, the anomaly detection system 120 selects only those Qj requests that present in a single network or single territory. The territory can refer to a continent, country, state, county, city, district, building, office, or apartment.

The anomaly detection system 120 then calculates a count value for each of 10-minute window so that each of the count values represents a number of instances or frequency Qj requests appear within one of the 10-minute window. As discussed above, the count values can be normalized, compared to each other, and further an anomaly trend can be detected if one the count values exceeds a predetermined threshold value. In some embodiments, the predetermined threshold value can be based on an average or a median of all count values. For example, an anomaly can be detected when at least one of the count values is higher more than on 50% of the average or median of all count values. In another embodiment, an anomaly is detected when at least one of the count values is higher more than on 25% of the second highest count value.

In a second example use case, the anomaly detection system 120 obtained DNS requests in 10-minute windows. The anomaly detection system 120 then selected the query Qi with the timestamp ti. Further, in the time window that contains ti, the anomaly detection system 120 search for other DNS requests Qj in the way that Qj be a subset of Qi, and Qi begins with Qj meaning that Qi and Qj share one or more common subdomains. At the following steps, the anomaly detection system 120 selects only those DNS requests Qj that are associated with one and the same CDN (for example, only those DNS requests are selected which are associated with the subdomain name having a string "cdn").

The anomaly detection system 120 then calculates a count value for each of 10-minute window so that each of the count values represents a number of instances or frequency Qj requests appear within one of the 10-minute window. As discussed above, the count values can be normalized, and further an anomaly trend can be detected if one the count values exceeds a predetermined threshold value (e.g., in the range from 2 to billions). In some embodiments, an anomaly can be detected when at least one of the count values is higher more than on 100% of the average or median of all count values. In another embodiment, an anomaly is detected when at least one of the count values is higher more than on 50% of the second highest count value.

In a third example use case, the anomaly detection system 120 substantially performs as in the first two example use cases, however the anomaly detection system 120 also automatically detects a family of domain names. For example, the anomaly detection system 120 can determine DNS requests associated with the family containing: stop-road215.info., stop-road213.info., and stop-road21.info. This family determination can be made by using an automata theory, Markov machines, and auto-encoders to learn patterns and compute the semantic similarity between the strings of domains. In some embodiments, the anomaly detection system 120 can generate clusters associated with the first DNS query and the second DNS requests in a database. The clusters can facilitate in automated anomaly detection using, for example, machine-learning algorithms.

In a fourth example use case, the anomaly detection system 120 can be focused on detecting spikes in subdomain-related DNS requests. This can be an important use case for probabilistic identification of random subdomain attacks. Random subdomain attack is a DNS attack, which generates a large number of unique subdomains for the target domain name to overload the authoritative DNS server. The subdomain spike detection algorithm run by the anomaly detection system 120 can capture this behavior and report this random subdomain attack.

In this use case example, the anomaly detection system 120 can use a linear probabilistic counting technique for calculating the number of unique subdomains. This method ensures low memory cost and accurate subdomain spike detection. Substantial steps of this method include receiving DNS requests from a storage or from a live stream, aggregating the number of DNS requests for each second-to-the-left domain (e.g., abc.www.google.com. is counted as a subdomain query to www.google.com). Further, if the aggregated number of DNS requests reaches a certain predetermined threshold, e.g. 10,000, the anomaly detection system 120 creates a probabilistic counting hash table for this second-to-the-left domain and starts counting the number of unique subdomains. When the streaming of DNS requests is stopped, the anomaly detection system 120 exports a list of suspicious second-to-the-left domains. This list can be cross-checked with some known attacks, such as PRSD type-A, PRSD type-B, known device activities (routers with search domain for example), known ISP services, legitimate service load balancer (web-based email system like outlook.com for example) and other known DNS tunneling domains.

It shall be noted that the detection can be on the second-to-the-left domain level and on the core domain level. If the detection is on the second-to-the-left, it is noted that typical PRSD type-A attack prepends a random string to the left of the domain for creating a random query. Aggregating the number of unique subdomain to second-to-the-left domain can detect PRSD type-A and other similar random subdomain attack. If the detection is on a core domain, it is noted that typical PRSD type-B attack and other types of attack may have multi-level of random subdomain. Aggregating the number of unique subdomain to the core domain can detect these attacks.

In some embodiments, the anomaly detection system 120 can be configured to flag or mark those domain names (including core domain names and subdomain names), servers, or clients, which are associated with an anomaly trend detected by the anomaly detection system 120. Moreover, in certain embodiments, the anomaly detection system 120 can provide an automatic email alert service and/or a web-based activity dashboard for reporting suspicious subdomain spikes.

Figure 2:
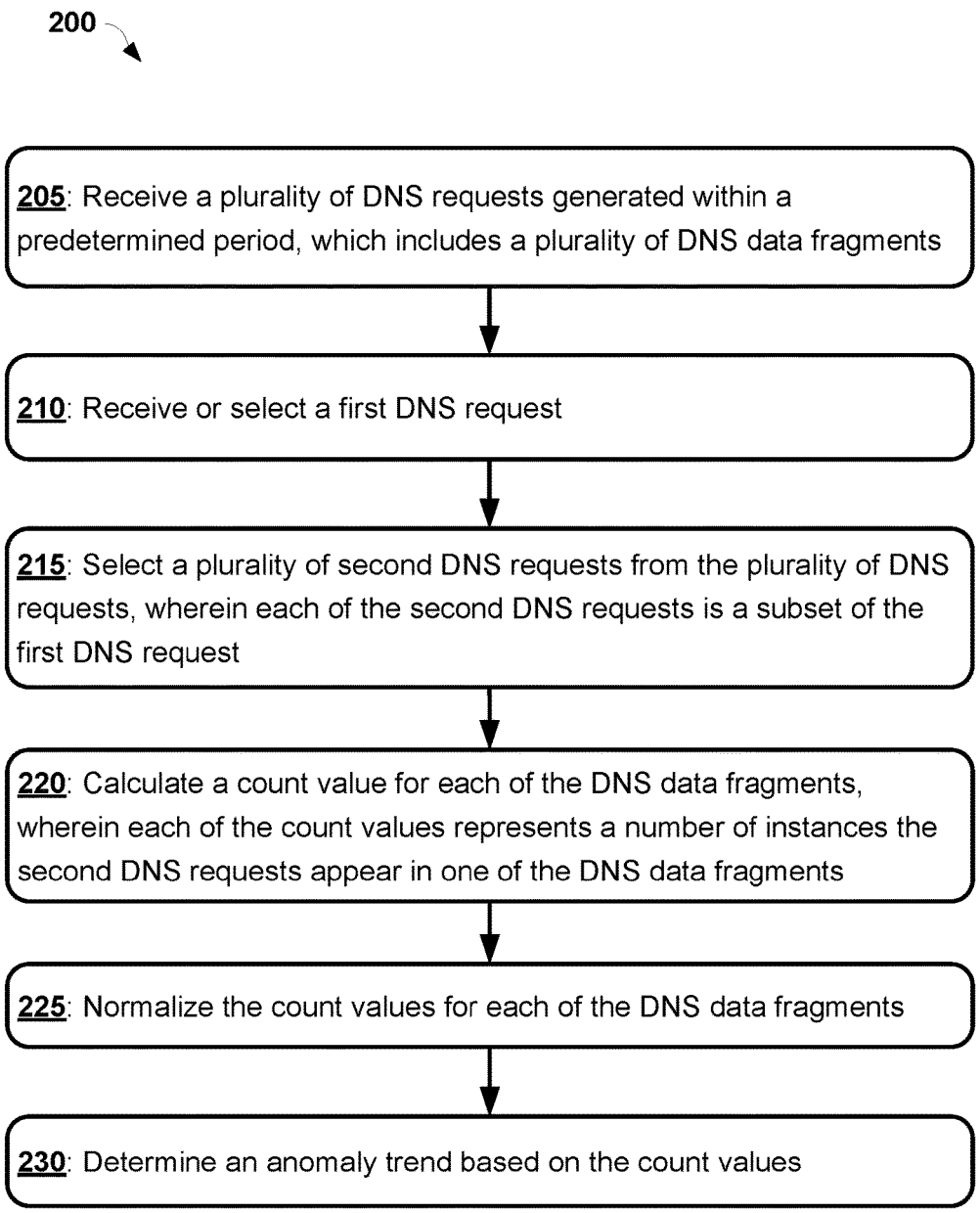
FIG. 2 is a flow chart of an example method for detecting anomalies in DNS requests.

FIG. 2 is a flow chart of an example method 200 for detecting anomalies of DNS requests according to some embodiments. The method 200 for detecting anomalies of DNS requests may be performed by processing logic that may comprise hardware (e.g., decision-making logic, dedicated logic, programmable logic, and microcode), software (such as software run on a general-purpose computer system or a dedicated machine), or a combination of both. In one example embodiment, the processing logic refers to one or more components of the anomaly detection system 120 described above with reference to FIG. 1. Notably, the steps recited below may be implemented in an order different than described and shown in the figure. Moreover, the method 200 may have additional steps not shown herein, but which can be evident for those skilled in the art from the present disclosure. The method 200 may also have fewer steps than outlined below and shown in FIG. 2.

At operation 205, the anomaly detection system 120 receives DNS data, which includes a plurality of DNS requests generated within a predetermined period. The predetermined period includes a plurality of DNS data fragments. At operation 210, the anomaly detection system 120 receives or selects a first DNS request (Qi), which is associated with a domain name (e.g., a core domain name, one or more subdomain names). At operation 215, the anomaly detection system 120 selects a plurality of second DNS requests (Qj) from the plurality of DNS requests, where each of the second DNS requests is a subset of the first DNS request. In some embodiments, the first DNS request is associated with a domain name, and each of the second DNS requests is associated with the same domain name. In another embodiment, the first DNS request is associated with a core domain name, and each of the second DNS requests is associated with the same core domain name. In yet another embodiment, the first DNS request is associated with a domain name and one or more sub-domain names, while each of the second DNS requests is associated with at least one of the same sub-domain names. Further, in some embodiments, the first DNS request and each of the second DNS requests are associated with a single DNS network, a single CDN, or the first DNS request and each of the second DNS requests are originated from the same territory.

At operation 220, the anomaly detection system 120 calculates a count value for each of the DNS data fragments, where each of the count values represents a number of instances or frequency the second DNS requests appear within one of the DNS data fragments. At optional operation 225, the anomaly detection system 120 normalizes the count values for each of the DNS data fragments. The normalization process can include: calculating a total count value for the predetermined period, where the total count value represents a number of instances the second DNS requests appear within all of the DNS data fragments, and normalizing the count values by their corresponding norm values.

At operation 230, the anomaly detection system 120 determines an anomaly trend based on the count values of the plurality of second DNS requests associated with the plurality of the DNS data fragments. The determining of the anomaly trend may comprise determining that at least one of the count values exceeds a predetermined threshold value. The predetermined threshold value can be associated with an average or a median of the count values for the predetermined period. The anomaly trend can characterize a malicious activity associated with the first DNS request.

In some embodiments, the anomaly detection system 120 detects one or more families of the domain name, where the second DNS requests are associated with the one or more families of the domain name. In some embodiments, the anomaly detection system 120 can perform clustering the first DNS query and the plurality of second DNS requests in a database. In some more embodiments, the anomaly detection system 120 can mark or flag the first DNS query and the plurality of second DNS requests based on the determination of the anomaly trend.

Figure 3:
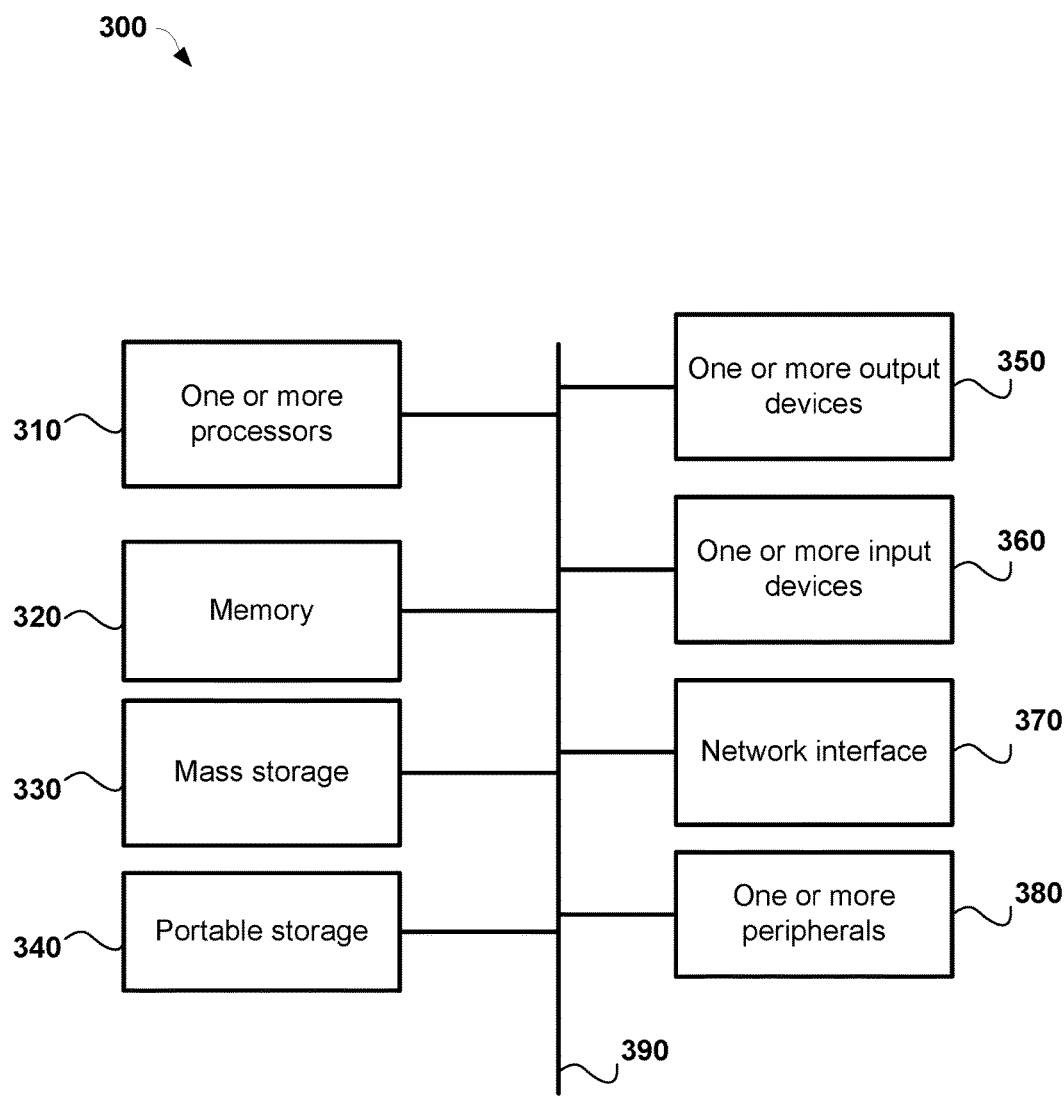
FIG. 3 is a computer system that may be used to implement the methods for detecting anomalies in DNS requests.

FIG. 3 illustrates an exemplary computing system 300 that may be used to implement embodiments described herein. The computing system 300 may be implemented in the contexts of the likes of client device 105, the DNS server 110, the anomaly detection system 120, and web resource 125. The computing system 300 may include one or more processors 310 and memory 320. Memory 320 stores, in part, instructions and data for execution by processor(s) 310. Memory 320 can store the executable code when the computing system 300 is in operation. The computing system 300 may further include a mass storage (device) 330, portable storage 340, one or more output devices 350, one or more input devices 360, a network interface 370, and one or more peripherals 380.

The components shown in FIG. 3 are depicted as being connected via a single bus 390. The components may be connected through one or more data transport means. Processor(s) 310 and memory 320 may be connected via a local microprocessor bus, and the mass storage 330, peripheral(s) 380, portable storage 340, and network interface 370 may be connected via one or more input/output (I/O) buses.

Mass storage 330, which may be implemented with a magnetic disk drive or an optical disk drive, is a non-volatile storage device for storing data and instructions for use by a magnetic disk or an optical disk drive, which in turn may be used by processor(s) 310. Mass storage 330 can store the system software for implementing embodiments described herein for purposes of loading that software into memory 320.

Portable storage 340 operates in conjunction with a portable non-volatile storage medium, such as a compact disk (CD) or digital video disc (DVD), to input and output data and code to and from the computing system 300. The system software for implementing embodiments described herein may be stored on such a portable medium and input to the computing system 300 via the portable storage 340.

Input devices 360 provide a portion of a user interface. Input devices 360 may include an alphanumeric keypad, such as a keyboard, for inputting alphanumeric and other information, or a pointing device, such as a mouse, a trackball, a stylus, or cursor direction keys. Additionally, the computing system 300 as shown in FIG. 3 includes output device(s) 350. Suitable output devices include speakers, printers, network interfaces, and monitors.

Network interface 370 can be utilized to communicate with external devices, external computing devices, servers, and networked systems via one or more communications networks such as one or more wired, wireless, or optical networks including, for example, the Internet, intranet, local area network (LAN), wide area network (WAN), cellular phone networks (e.g. Global System for Mobile (GSM) communications network, packet switching communications network, circuit switching communications network), Bluetooth radio, and an IEEE 802.11-based radio frequency network, among others. Network interface 370 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as a Universal Serial Bus (USB).

Peripheral(s) 380 may include any type of computer support device to add additional functionality to the computer system. Peripheral(s) 380 may include a modem or a router. Peripheral(s) 380 may also include input and output devices.

The components contained in the computing system 300 are those typically found in computer systems that may be suitable for use with embodiments described herein and are intended to represent a broad category of such computer components that are well known in the art. Thus, the computing system 300 can be a personal computer (PC), hand held computing device, telephone, mobile computing device, workstation, server, minicomputer, mainframe computer, or any other computing device. The computer can also include different bus configurations, networked platforms, multi-processor platforms, and so forth. Various operating systems (OS) can be used including UNIX, LINUX, WINDOWS, MACINTOSH OS, PALM OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the example embodiments. Those skilled in the art are familiar with instructions, processor(s), and storage media.

It is noteworthy that any hardware platform suitable for performing the processing described herein is suitable for use with the example embodiments. The terms "computer-readable storage medium" and "computer-readable storage media" as used herein refer to any medium or media that participate in providing instructions to a Central Processing Unit (CPU) for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire, and fiber optics, among others, including the wires that include one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-read-only memory (ROM) disk, DVD, any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Thus, methods and systems for detecting anomalies of DNS requests have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense. There are many alternative ways of implementing the present technology. The disclosed examples are illustrative and not restrictive.

What is claimed is:

1. A computer-implemented method for detecting anomalies in Domain Name System (DNS) requests, the method comprising:
receiving DNS data, the DNS data including a plurality of DNS requests generated within a time period, wherein the DNS data includes a plurality of DNS data fragments received during the time period;
the plurality of DNS requests including a first DNS request (Qi), wherein the first DNS request is associated with a domain name;
detecting a family of domain names associated with the domain name, said detecting comprising calculating a semantic similarity between strings of domain names;
selecting a plurality of second DNS requests (Qj) from the plurality of DNS requests, wherein each of the second DNS requests is member of the family of domain names;
calculating a count value for each of the DNS data fragments, wherein each of the count values represents a number of instances or frequency the second DNS requests appear within one of the DNS data fragments; and
determining an anomaly trend based on the count values of the plurality of second DNS requests associated with the plurality of the DNS data fragments.

2. The method of claim 1, further comprising normalizing the count values for each of the DNS data fragments.

3. The method of claim 2, wherein the normalizing of the count values for each of the DNS data fragments includes:
calculating a total count value for the predetermined period, wherein the total count value represents a number of instances the second DNS requests appear within all of the DNS data fragments; and
normalizing the count values by corresponding norm values.

4. The method of claim 1, wherein the family of domain names comprises at least domain names having the same top level domain name and different second level domain names.

5. The method of claim 1, wherein the determining of the anomaly trend comprises determining that at least one of the count values exceeds a predetermined threshold value.

6. The method of claim 1, wherein each of the DNS data fragments is in the range from about 1 second to about one week.

7. The method of claim 1, wherein the anomaly trend is determined using a machine learning classifier.

8. The method of claim 1, comprising performing said calculation of a semantic similarity with any of a Markov machine and an auto-encoder.

9. A computer-implemented system for detecting anomalies in Domain Name System (DNS) requests, the system comprising at least one processor and at least one memory storing processor-executable codes, wherein the at least one processor is configured to:
receive DNS data, the DNS data including a plurality of DNS requests generated within a time period, wherein the DNS data includes a plurality of DNS data fragments received during the time period;
the plurality of DNS requests including a first DNS request (Qi), wherein the first DNS request is associated with a domain name;
detect a family of domain names associated with the domain name, said detecting comprising calculating a semantic similarity between strings of domain names;
select a plurality of second DNS requests (Qj) from the plurality of DNS requests, wherein each of the second DNS requests is member of the family of domain names;
calculate a count value for each of the DNS data fragments, wherein each of the count values represents a number of instances or frequency the second DNS requests appear within one of the DNS data fragments; and
determine an anomaly trend based on the count values of the plurality of second DNS requests associated with the plurality of the DNS data fragments.

10. The system of claim 9, wherein the at least one processor is configured to: normalize the count values for each of the DNS data fragments.

11. The system of claim 10, wherein the normalizing of the count values for each of the DNS data fragments includes:
    calculating a total count value for the predetermined period, wherein the total count value represents a number of instances the second DNS requests appear within all of the DNS data fragments; and
    normalizing the count values by corresponding norm values.

12. The system of claim 9, wherein the family of domain names comprises at least domain names having the same top level domain name and different second level domain names.

13. The system of claim 9, wherein the determining of the anomaly trend comprises determining that at least one of the count values exceeds a predetermined threshold value.

14. The system of claim 9, wherein each of the DNS data fragments is in the range from about 1 second to about one week.

15. The system of claim 9, wherein the anomaly trend is determined using a machine learning classifier.

16. A non-transitory processor-readable medium having instructions stored thereon, which when executed by one or more processors, cause the one or more processors to implement a method for detecting anomalies in Domain Name System (DNS) requests, the method comprising:
    receiving DNS data, the DNS data including a plurality of DNS requests generated within a time period, wherein the DNS data includes a plurality of DNS data fragments received during the time period;
    the plurality of DNS requests including a first DNS request ($Q_i$), wherein the first DNS request is associated with a domain name;
    detecting a family of domain names associated with the domain name, said detecting comprising calculating a semantic similarity between strings of domain names;
    selecting a plurality of second DNS requests ($Q_j$) from the plurality of DNS requests, wherein each of the second DNS requests is member of the family of domain names;
    calculating a count value for each of the DNS data fragments, wherein each of the count values represents a number of instances or frequency the second DNS requests appear within one of the DNS data fragments; and
    determining an anomaly trend based on the count values of the plurality of second DNS requests associated with the plurality of the DNS data fragments.

* * * * *